UNITED STATES PATENT OFFICE.

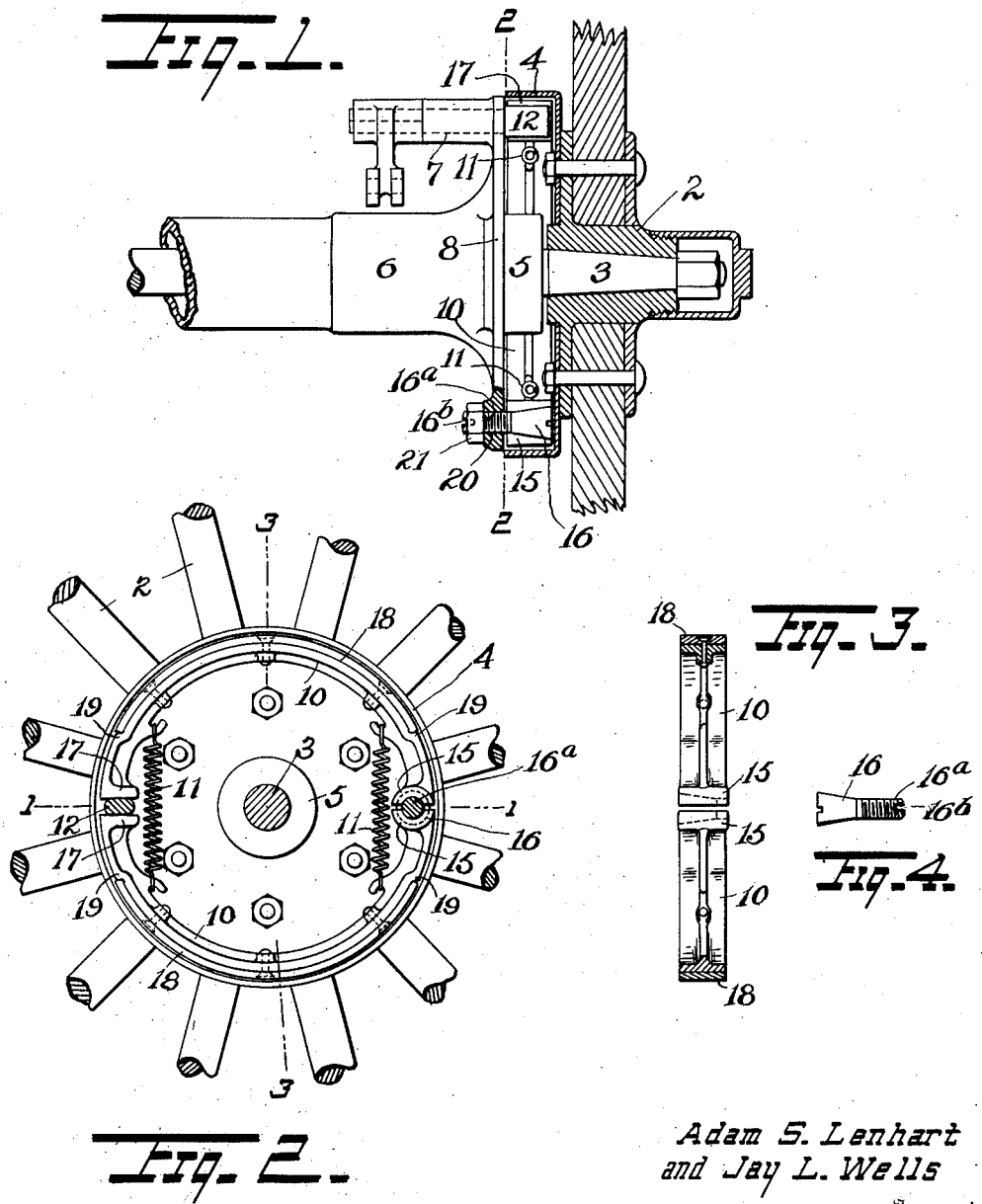

ADAM S. LENHART AND JAY L. WELLS, OF HAMBURG, PENNSYLVANIA.

BRAKE FOR AUTOMOBILES.

1,113,567. Specification of Letters Patent. Patented Oct. 13, 1914.

Application filed November 5, 1913. Serial No. 799,282.

*To all whom it may concern:*

Be it known that we, ADAM S. LENHART and JAY L. WELLS, both citizens of the United States, residing at Hamburg, in the county of Berks and State of Pennsylvania, have invented certain new and useful Improvements in Brakes for Automobiles, of which the following is a specification.

Our invention relates particularly to braking devices for automobiles in which a rotary brake-drum is employed, in connection with internally arranged brake shoes and means for pivotally spreading the latter to frictionally engage the inner surface of the drum; and it consists in providing very simple and improved means for conveniently and satisfactorily taking up wear of the shoes during service, as fully described in connection with the accompanying drawings and specifically pointed out in the claim.

Figure 1 is a partly sectional view showing portions of a rear axle and driving wheel of an automobile, with a brake mechanism embodying our invention applied thereto. Fig. 2 is a transverse section taken on the line 2—2 of Fig. 1. Fig. 3 is a cross-sectional view of the brake shoes, on the line 3—3 of Fig. 2; and Fig. 4 is a separate view of the adjusting pivot-pin.

Referring to the drawings, 2 represents a driving wheel, which is fixed to an axle 3, and carries a brake drum 4. The axle 3 is mounted in a bearing box 5 of its casing 6, and a brake-operating shaft 7 is mounted in a flange portion 8 of the latter. The approximately semicircular brake shoes 10, within the drum 4, are normally drawn together by connecting springs 11, and are spread by a cam 12 on the operating shaft 7 so as to frictionally engage the inner surface of the drum; this general construction and manner of operating being well known in the art.

The shoes 10 form separate halves of a split ring within the drum, and have abutting pivot-ends 15 arranged to jointly engage an interposed pivot-pin 16, while their opposite ends 17 are engaged by the interposed spreading cam 12 on operating shaft 7. The outer curved surface of the shoes, which are moved into contact with the inner surface of the rotary drum are preferably provided with removably secured friction-strips 18 of asbestos or like material, which are placed between ribs or offsets 19 formed on the shoes and serve to insure proper frictional contact and at the same time permit of ready renewal when required. In our improved construction, this pivot-pin 16 with which the opposed pivot-ends 15 of the shoes 10 engage, and against which said pivot-ends are pressed when the opposite ends 17 are spread by operation of the cam shaft 7, is adapted to serve as an adjustable spreading device for the pivot-ends of the shoes; the purpose of such spreading action being merely to compensate, at required intervals, for such wearing down of the friction surface of the shoes as would otherwise prevent proper frictional engagement with the drum and necessitate undue movement of the operating shaft 7. This object is attained by simply forming the pivot-pin 16 with a tapering or conical body portion as shown in Fig. 4, and with a screw-threaded end portion 16ª arranged to engage a screw-threaded opening 20 in the flange portion 8 of the axle bearing or casing. This screw-threaded end portion of the conical screw extends through the bearing flange or arm 8 and is formed with a screw-driver slot 16ᵇ and lock nut 21, thus permitting of convenient adjustment of the pivot-pin without removing the drive wheel. Thus the conical pivot-pin is readily set to correspond when new shoes, or renewed friction strips thereon, are in service; and when wear occurs it may be readily adjusted so as to spread the pivot-ends of the shoes and correspondingly move the worn friction surfaces closer to the drum, thereby reducing to normal the required movement of the operating shaft 7, and permitting further satisfactory service until renewal of the shoes or their friction strips is necessary; the life of the shoes and their satisfactory service, being thus greatly prolonged, and the annoyance, cost, and trouble or renewals decreased.

What we claim is:—

In a brake device for automobiles the combination with an axle carrying a drive-wheel brake-drum, and a fixed casing for said axle; a pair of spring-connected semi-circular brake shoes within said drum each having a pivot-pin abutting end, a pivot pin secured to said fixed casing, and means for spreading the opposite ends of the shoes; said pivot pin having a conical body portion interposed between said abutting ends and a screw-threaded portion, whereby the abutted ends of said shoes may be spread, substantially as set forth.

In testimony whereof we affix our signatures in presence of two witnesses.

ADAM S. LENHART.
JAY L. WELLS.

Witnesses:
ADAM L. OTTERBEIN,
D. M. STEWART.